United States Patent
Saito et al.

(10) Patent No.: US 10,584,257 B2
(45) Date of Patent: Mar. 10, 2020

(54) TREATMENT LIQUID COMPOSITION AND PRINTING METHOD

(71) Applicant: Seiko Epson Corporation, Tokyo (JP)

(72) Inventors: Toru Saito, Yamagata (JP); Masayuki Murai, Matsumoto (JP); Ryota Miyasa, Matsumoto (JP)

(73) Assignee: Seiko Epson Corporation (JP)

( * ) Notice: Subject to any disclaimer, the term of this patent is extended or adjusted under 35 U.S.C. 154(b) by 432 days.

(21) Appl. No.: 15/450,283

(22) Filed: Mar. 6, 2017

(65) Prior Publication Data

US 2017/0292035 A1 Oct. 12, 2017

(30) Foreign Application Priority Data

Apr. 6, 2016 (JP) ................. 2016-076549

(51) Int. Cl.

| | | |
|---|---|---|
| C09D 11/54 | (2014.01) | |
| C09D 11/38 | (2014.01) | |
| C09D 11/102 | (2014.01) | |
| C09D 11/107 | (2014.01) | |
| C09D 11/322 | (2014.01) | |
| B41J 2/01 | (2006.01) | |
| B41J 11/00 | (2006.01) | |
| B41M 7/00 | (2006.01) | |
| B41M 5/00 | (2006.01) | |
| D06P 5/30 | (2006.01) | |
| D06P 1/44 | (2006.01) | |
| D06P 1/52 | (2006.01) | |
| D06P 1/651 | (2006.01) | |
| D06P 1/673 | (2006.01) | |

(52) U.S. Cl.
CPC ............... *C09D 11/38* (2013.01); *B41J 2/01* (2013.01); *C09D 11/102* (2013.01); *C09D 11/107* (2013.01); *C09D 11/322* (2013.01); *C09D 11/54* (2013.01); *D06P 1/44* (2013.01); *D06P 1/5285* (2013.01); *D06P 1/65118* (2013.01); *D06P 1/6735* (2013.01); *D06P 5/30* (2013.01)

(58) Field of Classification Search
None
See application file for complete search history.

(56) References Cited

U.S. PATENT DOCUMENTS

| | | | | |
|---|---|---|---|---|
| 9,156,993 B2* | 10/2015 | Saito | ................... | C09D 1/00 |
| 9,206,547 B2* | 12/2015 | Saito | ................... | D06P 5/002 |
| 9,279,062 B2* | 3/2016 | Mitsuzawa | ............ | C09D 11/40 |
| 9,902,833 B2* | 2/2018 | Sugiyama | ............... | C08K 3/16 |
| 2003/0079643 A1* | 5/2003 | Tomioka | ............ | B41M 7/0018 106/31.27 |
| 2009/0244117 A1* | 10/2009 | Makuta | ............... | B41M 5/0017 347/6 |
| 2010/0055325 A1* | 3/2010 | Sakai | ................ | B41M 5/0017 427/261 |
| 2011/0200751 A1* | 8/2011 | Yatake | ................. | B41J 3/4078 427/261 |
| 2012/0268521 A1* | 10/2012 | Moribe | ............... | C09D 11/322 347/21 |
| 2014/0253631 A1* | 9/2014 | Namba | ................. | C09D 11/54 347/21 |
| 2015/0091974 A1* | 4/2015 | Aoyama | ............. | B41M 5/0017 347/21 |
| 2015/0174939 A1* | 6/2015 | Aoyama | ............. | C09D 11/322 347/21 |
| 2015/0239261 A1* | 8/2015 | Sugiyama | ............... | C08K 3/16 347/21 |
| 2016/0060810 A1* | 3/2016 | Saito | ................... | D06P 5/30 347/21 |
| 2016/0083603 A1* | 3/2016 | Okuda | ................. | C09D 11/54 347/21 |
| 2016/0194824 A1* | 7/2016 | Ohashi | ................. | D06P 5/002 347/20 |
| 2016/0250861 A1* | 9/2016 | Yano | .................. | B41J 2/2107 347/21 |
| 2016/0251532 A1* | 9/2016 | Yano | .................. | B41J 2/2114 347/21 |
| 2017/0232763 A1* | 8/2017 | Okuda | ................. | B41J 2/01 347/21 |
| 2018/0058002 A1* | 3/2018 | Ohashi | ................. | B41J 2/01 |
| 2019/0077981 A1* | 3/2019 | Uotome | ................ | B41J 2/01 |
| 2019/0092959 A1* | 3/2019 | Matsuzaki | ............ | C09D 11/54 |

FOREIGN PATENT DOCUMENTS

| | | |
|---|---|---|
| JP | 2003-055886 A | 2/2003 |
| JP | 2006-124843 A | 5/2006 |
| JP | 2009-299240 A | 12/2009 |
| WO | WO 2017/154683 A1 * | 9/2017 |

* cited by examiner

*Primary Examiner* — Helene Klemanski
(74) *Attorney, Agent, or Firm* — Harness, Dickey & Pierce, P.L.C.

(57) ABSTRACT

A treatment liquid composition contains water, 1,2-alkanediol, and an aggregating agent aggregating or thickening components of an ink composition containing a pigment and is used for a printing method performed by causing the ink composition to adhere to cloth by an ink jet method.

10 Claims, No Drawings

TREATMENT LIQUID COMPOSITION AND PRINTING METHOD

BACKGROUND

1. Technical Field

The present invention relates to a treatment liquid composition and a printing method.

2. Related Art

An ink jet recording method is a method including discharging small ink liquid droplets from a fine nozzle to cause the ink liquid droplets to adhere to a recording medium for recording. This method has a feature that high resolution and high quality images can be recorded at high speed with a relatively inexpensive apparatus. The ink jet recording method has had very large number of elements to be examined including the properties of an ink to be used, the stability in recording, and the quality of an image to be obtained, and thus a research of not only an ink jet recording apparatus but an ink composition to be used has been actively conducted.

Moreover, cloth and the like are also dyed (printed) using the ink jet recording method. Heretofore, as a printing method for cloth (textiles and nonwoven fabric), a screen printing method, a roller printing method, and the like have been used. However, it is advantageous to apply the ink jet recording method from the viewpoint of wide-variety small-lot productivity and instant printability, and therefore the method has been variously examined.

So-called pigment printing including printing cloth using a combination of a pigment and a fixing resin with an ink composition has been examined. In the case of the pigment printing, it is important to physically stick a pigment to fibers and the like of cloth.

JP-A-2003-055886, JP-A-2009-299240, and JP-A-2006-124843 disclose an attempt of causing a treatment liquid referred to as a reaction liquid, a pretreatment liquid, or the like to adhere to cloth before causing an ink composition to adhere to the cloth to increase the fixability of the ink composition in the pigment printing.

By the use of a treatment liquid composition (pretreatment liquid) in the pigment printing, it can be expected that the treatment liquid composition is caused to react with an ink composition to cause a coloring material to stick at an early stage to prevent the permeation of the ink composition to cloth to improve the color development properties. However, according to an examination of the present inventors, it has been found that a surfactant, which is compounded in the treatment liquid composition in order to improve wetting spreadability and the like of the treatment liquid composition, reduces the washing durability (coating film adhesion resistant to washing) of an ink coating film of a printed article.

Moreover, it has been found that, when a surfactant is used as a wet spreading agent of the treatment liquid composition, there is a tendency for the adaptability to variation in medium (cloth) to decrease. More specifically, it has been found that the permeability of the treatment liquid composition to cloth varies depending on the manufacturer, the model number, the thickness, and the like of cloth and, in a certain cloth, the treatment liquid composition excessively permeates, so that an aggregating agent contained in the treatment liquid composition does not remain on the cloth surface, and thus an effect of aggregating components of the ink composition and an effect of thickening the ink composition are not sufficiently demonstrated and the image quality, such as color development properties.

SUMMARY

An advantage of some aspects of the invention is to provide a treatment liquid composition having moderate permeability into cloth and good adaptability to the type of cloth and capable of forming a printed article having excellent color development properties and washing durability and a printing method.

The invention has been made in order to solve at least part of the above-described problems and can be realized as the following aspects or application examples.

According to one aspect of a treatment liquid composition of the invention, the treatment liquid composition contains water, 1,2-alkanediol, and an aggregating agent aggregating or thickening components of an ink composition containing a pigment and is used for a printing method performed by causing the ink composition to adhere to cloth by an ink jet method.

According to such a treatment liquid composition, the 1,2-alkanediol is contained, and therefore the surface tension is moderate. Therefore, when caused to adhere to cloth, the treatment liquid composition can be stabilized in a state where the permeability into cloth is moderate. Thus, even when there is variation in the form and the lot of cloth, the aggregating agent can be fixed at a good position for the adhesion of the ink composition. Therefore, when the ink composition adheres to the cloth to which the treatment liquid composition is caused to adhere, a printed article having excellent color development properties can be formed. Moreover, according to the treatment liquid composition, 1,2-alkanediol is contained, and therefore the washing durability can also be satisfactorily maintained without reduction.

In the treatment liquid composition according to an aspect of the invention, the 1,2-alkanediol may have carbon atoms of 4 or more and 9 or less.

According to such a treatment liquid composition, the balance between a hydrophilic portion and a hydrophobic portion of the 1,2-alkanediol is better, and therefore, when caused to adhere to cloth, the permeability into cloth is still better. Thus, when the ink composition adheres to the cloth to which the treatment liquid composition is caused to adhere, a printed article having more excellent color development properties can be formed.

In the treatment liquid composition according to an aspect of the invention, the content of a surfactant in the treatment liquid composition may be 0.05% by mass or less.

According to such a treatment liquid composition, the content of the surfactant is small, and therefore a printed article having excellent washing durability can be obtained.

In the treatment liquid composition according to an aspect of the invention, the surface tension may be 38 mN/m or more.

According to such a treatment liquid composition, the surface tension is more moderate, and therefore, when caused to adhere to cloth, the treatment liquid composition can be caused to remain in a state where the permeability into cloth is more suitable.

In the treatment liquid composition according to an aspect of the invention, the content of the 1,2-alkanediol may be 0.5% by mass or more and 10% by mass or less.

According to such a treatment liquid composition, the permeability into cloth is good and the adaptability to the type of cloth is better, and thus a printed article having more excellent color development properties and washing durability can be formed.

The treatment liquid composition according to an aspect of the invention may further contain a resin emulsion.

According to such a treatment liquid composition, the fixing of the pigment to cloth can be further strengthened.

In the treatment liquid composition according to an aspect of the invention, the ink composition may be a white ink composition containing a white coloring material.

According to such a treatment liquid composition, even when the white ink composition which is hard to increase color development properties and washing durability is used, a printed article having sufficiently excellent color development properties and washing durability can be formed.

In the treatment liquid composition according to an aspect of the invention, the weight per unit area of the cloth may be in the range of 3.0 oz or more and 8.0 oz or less.

According to such a treatment liquid composition, good pigment printing can be performed also to cloth having a weight per unit area in the range of 3.0 oz or more and 8.0 oz or less.

The treatment liquid composition according to an aspect of the invention may be used for two or more kinds of the cloth different in weight per unit area.

According to such a treatment liquid composition, good pigment printing can be performed also to cloth different in weight per unit area.

In the treatment liquid composition according to an aspect of the invention, the treatment liquid composition may be given to the cloth by either a contact type method or a non-contact type method in the printing method.

According to such a treatment liquid composition, a printed article having sufficiently excellent color development properties and washing durability can be formed.

One aspect of a printing method of the invention includes a process of causing a treatment liquid composition containing water, 1,2-alkanediol, and an aggregating agent aggregating or thickening components of an ink composition containing a pigment to adhere to cloth, and a process of causing the ink composition containing the pigment to adhere to the cloth by an ink jet method.

According to such a printing method, the treatment liquid composition containing 1,2-alkanediol and having moderate surface tension is used, and therefore the treatment liquid composition can be stabilized in a state where the permeability into the cloth of the treatment liquid composition is moderate by the process of causing the same to adhere to the cloth. Thus, even when there is variation in the form and the lot of the cloth, the aggregating agent contained in the treatment liquid composition can be caused to remain at a good position for the adhesion of the ink composition. Therefore, by performing the process of causing the ink composition to adhere to the cloth to which the treatment liquid composition is caused to adhere, a printed article having excellent color development properties can be formed. Moreover, according to the printing method, the treatment liquid composition containing 1,2-alkanediol is used, the washing durability of a printed article to be obtained can also be improved.

DESCRIPTION OF EXEMPLARY EMBODIMENTS

Hereinafter, some embodiments of the invention are described. The embodiments described below describe an example of the invention. The invention is not limited to the following embodiments at all and also includes various modifications implemented in the range where the scope of the invention is not altered. All the configurations described below are not necessarily indispensable configurations of the invention.

1. Treatment Liquid Composition

A treatment liquid composition according to this embodiment is used for a printing method performed by causing an ink composition to adhere to cloth by an ink jet method. More specifically, the treatment liquid composition according to this embodiment is used for printing cloth by causing the treatment liquid composition to adhere to the cloth, and then causing the ink composition to adhere to the cloth by an ink jet method. The treatment liquid composition of this embodiment contains water, 1,2-alkanediol, and an aggregating agent.

1.1. Water

The treatment liquid composition according to this embodiment contains water. Examples of the water include, for example, substances in which ionic impurities are removed as much as possible, such as pure water and ultrapure water, such as ion exchanged water, ultrafiltration water, reverse osmosis water, and distilled water. When water sterilized by irradiation with ultraviolet rays, addition of hydrogen peroxide, or the like is used, the generation of bacteria or fungi can be prevented when the treatment liquid composition is stored for a long period of time.

The content of the water is 30% by mass or more, preferably 40% by mass or more, more preferably 45% by mass or more, and still more preferably 50% by mass or more based on the total amount of the treatment liquid composition. When the water in the treatment liquid composition is referred to, a resin particle dispersion liquid used as a raw material and water to be added, for example, are included. Due to the fact that the content of the water is 30% by mass or more, the viscosity of the treatment liquid composition can be made relatively low. The upper limit of the content of the water is preferably 90% by mass or less, more preferably 85% by mass or less, and still more preferably 80% by mass or less based on the total amount of the treatment liquid composition.

1.2. 1,2-Alkanediol

The treatment liquid composition of this embodiment contains 1,2-alkanediol. Due to the fact that the treatment liquid composition contains 1,2-alkanediol, the permeability into cloth (printing target) of the treatment liquid composition can be made moderate. The 1,2-alkanediol is a compound having a structure in which two hydroxyl groups are individually bonded to carbons on the first and second positions of one terminal of alkane (hydrocarbon) having 3 or more carbon atoms.

The 1,2-alkanediol has a hydrophobic portion containing a hydrocarbon chain and a hydrophilic portion formed by disposing two hydroxyl groups at the terminal of the hydrocarbon chain. The hydrocarbon chain may have a straight chain shape or a branched chain shape. In the treatment liquid composition of this embodiment, one in which two hydroxyl groups are disposed at the terminal of a straight chain hydrocarbon is preferable.

Examples of such 1,2-alkanediol include 1,2-alkanediols having carbon atoms of 3 or more and 14 or less, such as 1,2-propanediol, 1,2-butanediol, 1,2-pentanediol, 1,2-hexanediol, 1,2-heptanediol, 1,2-octanediol, 1,2-nonanediol, 1,2-decanediol, 1,2-undecanediol, 1,2-dodecanediol, 1,2-tridecanediol, and 1,2-tetradecanediol. Among the above, in the treatment liquid composition of this embodiment, the number of the carbon atoms of the 1,2-alkanediol is preferably 4 or more and 12 or less, more preferably 4 or more and 10 or less, still more preferably 4 or more and 9 or less, and particularly preferably 6 or more and 9 or less from the viewpoint of not excessively reducing the permeability into cloth and the interfacial tension.

The treatment liquid composition may further contain two or more kinds of the 1,2-alkanediol mentioned above. The total content of the 1,2-alkanediols is 0.1% by mass or more and 20% by mass or less, preferably 0.3% by mass or more and 15% by mass or less, more preferably 0.5% by mass or more and 10% by mass or less, and still more preferably 1% by mass or more and 7% by mass or less based on the entire treatment liquid composition.

1.3. Aggregating Agent

The treatment liquid composition of this embodiment contains an aggregating agent. The aggregating agent aggregates or thickens components of the ink composition (described later) containing a pigment. More specifically, the aggregating agent has a function of aggregating the pigment through an interaction with at least one of a pigment and a resin contained in the ink composition. Thus, the color development properties and the fixability of an image to be recorded by the ink composition can be increased. The aggregating agent can increase the viscosity (thicken) of the ink composition through an interaction with at least one of the pigment and the resin contained in the ink composition. Thus, excessive permeation of the ink composition into cloth can be prevented and blurring and bleeding can be reduced.

Examples of the aggregating agent include, but not limited thereto, metallic salts, organic acids, cationic compounds, and the like. As the cationic compound, cationic resin, cationic surfactants, and the like are usable. As the metallic salts, polyvalent metallic salts are preferable but metallic salts other than polyvalent metallic salts are also usable. Among the aggregating agents, it is preferable to use at least one kind selected from metallic salts and organic acids from the viewpoint that the reactivity with the components contained in the ink composition is excellent.

By neutralizing the surface charges of the components contained in the ink composition or varying the pH of the ink composition by the aggregating agent, these components are aggregated or deposited, so that the ink composition is aggregated or thickened. Examples of the components contained in the ink composition and reacting with the aggregating agent include pigments, resin, and the like mentioned below.

Examples of polyvalent metallic compounds among metallic salts include, but not limited to the substances mentioned below, a titanium compound, a chromium compound, a copper compound, a cobalt compound, a strontium compound, a barium compound, an iron compound, an aluminum compound, a calcium compound, a magnesium compound, and salts (polyvalent metallic salts) thereof, for example. Among the polyvalent metallic compounds, one or more kinds selected from the group consisting of aluminum compounds, calcium compounds, magnesium compounds, and salts thereof are preferable, dissociating salts of alkaline earth metals, such as calcium and magnesium, are more preferable, and at least either calcium salt or magnesium salt is still more preferable because the pigment can be effectively aggregated.

The polyvalent metallic compounds are preferably ionic polyvalent metallic salts. Particularly when the polyvalent metallic salts are magnesium salts or calcium salts, the stability of the treatment liquid composition is further improved. Counter ions of the polyvalent metals may be either inorganic acid ions or organic acid ions.

Specific examples of the polyvalent metallic salts include calcium carbonates, such as heavy calcium carbonate and light calcium carbonate, calcium nitrate, calcium chloride, calcium sulfate, magnesium sulfate, barium sulfate, zinc carbonate, aluminum silicate, calcium silicate, magnesium silicate, and the like. Among the above, since sufficient solubility in water can be secured and the remaining of marks due to the treatment liquid composition decreases (marks are not conspicuous), at least any one of magnesium sulfate, calcium nitrate, and calcium chloride is preferable and calcium nitrate is more preferable.

Examples of metallic salts other than the polyvalent metallic salts include monovalent metallic salts, such as sodium salt and potassium salt. Sodium sulfate, potassium sulfate, and the like are mentioned. The polyvalent metallic compounds may be used alone or in combination of two or more kinds thereof.

Examples of the polyvalent metallic compounds include, besides the substances mentioned above, inorganic pigments, such as chalk, kaolin, calcined clay, talc, titanium oxide, zinc oxide, zinc sulfide, synthetic silica, aluminum hydroxide, alumina, sericite, white carbon, saponite, calcium montmorillonite, sodium montmorillonite, and bentonite, and organic pigments, such as acrylic plastic pigments and urea polymer substances.

As the organic acids, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyronecarboxylic acid, pyrrolecarboxylic acid, furancarboxylic acid, pyridinecarboxylic acid, coumaric acid, thiophenecarboxylic acid, nicotinic acid, derivatives of these compound, or salts thereof is/are preferably mentioned, for example. The organic acids may be used alone or in combination of two or more kinds thereof.

As the inorganic acids, sulfuric acid, hydrochloric acid, nitric acid, phosphoric acid, or salts thereof is/are preferably mentioned, for example. The inorganic acids may be used alone or in combination of two or more kinds thereof.

Examples of the cationic resin include, for example, cationic urethane-based resin, cationic olefin-based resin, cationic allylamine-based resin, and the like.

As the cationic urethane-based resin, known substances can be selected as appropriate to be used. As the cationic urethane-based resin, commercially-available items are usable and, for example, HYDRAN CP-7010, CP-7020, CP-7030, CP-7040, CP-7050, CP-7060, and CP-7610 (Trade names, manufactured by Dainippon Ink and Chemicals, Incorporated), SUPERFLEX 600, 610, 620, 630, 640, and 650 (Trade names, manufactured by Daiichi Kogyo Seiyaku Co., Ltd.), urethane emulsion WBR-2120C and WBR-2122C (Trade names, manufactured by TAISEI FINE CHEMICAL CO. LTD.), and the like are usable.

The cationic olefin resin has olefin, such as ethylene and propylene, in the structure skeleton, and known substances can be selected as appropriate to be used. The cationic olefin resin may be in an emulsion state in which the cationic olefin resin is dispersed in a solvent containing water, an organic solvent, and the like. As the cationic olefin resin, commercially-available items are usable and, for example, Arrow Base CB-1200 and CD-1200 (Trade names, manufactured by UNITIKA LTD.), and the like are mentioned.

As the cationic allylamine-based resin, known substances can be selected as appropriate to be used. For example, polyallylamine hydrochloride, polyallylamineamide sulfate, an allylamine hydrochloride.diallylamine hydrochloride copolymer, an allylamine acetate.diallyl amine acetate copolymer, an allylamineacetate.diallylamineacetate copolymer, an allylamine hydrochloride.dimethylallylamine hydrochloride copolymer, an allylamine.dimethyl allylamine copolymer, polydiallylamine hydrochloride, polymethyl diallylamine hydrochloride, polymethyl diallylamineamidosulfate, polymethyl diallylamineacetate, polydiallyl dimethylammoniumchloride, a diallylamine acetate.sulfur dioxide copolymer, a diallylmethylethyl ammoniumehylsulfate.sulfur dioxide copolymer, a methyl diallylamine hydrochloride.sulfur dioxide copolymer, a diallyl dimethylammonium chloride.sulfur dioxide copolymer, a diallyldimethyl ammoniumchloride.acrylamide copolymer, and the like can be mentioned. As such cationic allylamine-based resin, commercially-available items are usable. For example, PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-H-1L, PAS-H-5L, PAS-H-10L, PAS-92, PAS-92A, PAS-J-81L, and PAS-J-81 (Trade names, manufactured by NITTOBO MEDICAL CO., LTD.), Hymo Neo-600, Hymolock Q-101, Q-311, and Q-501, and Himax SC-505 (Trade names, manufactured by Hymo Corp.), and the like are usable.

Examples of the cationic surfactant include, for example, primary, secondary, and tertiary amine salt type compounds, an alkylamine salt, a dialkylamine salt, an aliphaticamine salt, a benzalkonium salt, a quaternary ammonium salt, a quaternary alkylammonium salt, an alkylpyridinium salt, a sulfonium salt, a phosphonium salt, an onium salt, and an imidazolinium salt. Specific examples thereof include hydrochlorides and acetates of lauryl amine, coconut amine, rosin amine, and the like, lauryl trimethyl ammonium chloride, cetyl trimethyl ammonium chloride, benzyl tributyl ammonium chloride, benzalkonium chloride, dimethylethyl lauryl ammoniumethyl sulfate, dimethylethyl octylammoniumethyl sulfate, trimethyl lauryl ammonium hydrochloride, cetyl pyridinium chloride, cetyl pyridinium bromide, dihydroxyethyl laurylamine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The total content of the aggregating agents based on the entire treatment liquid composition of this embodiment can be determined as appropriate so that the above-described effects are demonstrated, and, for example, is preferably 0.1% by mass or more and 40% by mass or less, more preferably 2% by mass or more and 25% by mass or less, still more preferably 5% by mass or more and 20% by mass or less, and particularly preferably 10% by mass or more and 20% by mass or less based on the total mass of the treatment liquid composition.

1.4. Other Components

The treatment liquid composition may contain a resin emulsion, a moisturizer, a surfactant, and the like as other components.

1.4.1. Resin Emulsion

The treatment liquid composition may contain a resin emulsion. Due to the fact that the resin emulsion is contained, the fixing (sticking) properties to cloth of the pigment contained in the ink composition can be further improved in some cases. The resin emulsion may be caused to function as a filler to prevent the treatment liquid composition and/or the ink composition from permeating into cloth.

As such a resin emulsion, at least one kind of resin emulsion selected from a urethane-based resin emulsion, a styrene acryl-based resin emulsion, an acryl-based resin emulsion, and a vinyl chloride-vinyl acetate-based resin emulsion can be mentioned but the resin emulsion is not limited thereto. In the treatment liquid composition, one or more kinds among the resin emulsions are usable.

The urethane-based resin emulsion is not particularly limited insofar it has a urethane bond in the molecules. For example, a polyether type urethane-based resin emulsion containing an ether bond in the main chain, a polyester type urethane-based resin emulsion containing an ester bond in the main chain, and a polycarbonate type urethane-based resin emulsion containing a carbonate bond in the main chain, in addition to the urethane bond, are usable.

As the resin emulsion, a self-reaction type urethane-based resin emulsion, a styrene acrylic resin emulsion, and an acrylic resin emulsion may be used. Examples of such a self-reaction type resin emulsion include a urethane-based resin emulsion blocked by a blocking agent having a hydrophilic group, a blocked urethane-based resin emulsion to which a hydrophilic segment is imparted, an acrylic resin emulsion obtained by copolymerizing acrylic monomers having functional groups, such as a carboxyl group, a hydroxyl group, an amino group, and a methylol group, and the like.

D50 of resin particles in the resin emulsion is preferably 30 nm or more and 300 nm or less and more preferably 40 nm or more and 100 nm or less. When the D50 is in the ranges mentioned above, the resin emulsion particles can be uniformly dispersed in the treatment liquid composition. Moreover, the abrasion resistance of printed matter is more excellent.

Examples of commercially-available items of these resin emulsions include MICROGEL E-1002 and E-5002 (styrene-acrylic resin emulsions, manufactured by Nippon Paint Co., Ltd.), VONCOAT 4001 (acrylic resin emulsion, manufactured by Dainippon Ink and Chemicals, Incorporated), VONCOAT 5454 (styrene.acrylic resin emulsion, manufactured by Dainippon Ink and Chemicals, Incorporated), Polysol AM-710, AM-920, AM-2300, AP-4735, AT-860, and PSASE-4210E (acrylic resin emulsions), Polysol AP-7020 (styrene.acrylic resin emulsion), Polysol SH-502 (vinyl acetate resin emulsion), Polysol AD-13, AD-2, AD-10, AD-96, AD-17, and AD-70 (ethylene.vinyl acetate resin emulsions), Polysol PSASE-6010 (ethylene/vinyl acetate resin emulsion) (Trade names, manufactured by Showa Denko K.K.), Polysol SAE1014 (Trade name, styrene-acrylic resin emulsion, manufactured by Nippon Zeon Co., Ltd.), Saibinol SK-200 (Trade name, acrylic resin emulsion, manufactured by Saiden Chemical Industry Co., Ltd.), AE-120A (Trade name manufactured by JSR, acrylic resin emulsion), AE373D (Trade name manufactured by EMULSION TECHNOLOGY CO., LTD, carboxy-modified styrene.acrylic resin emulsion), SEIKADYNE 1900W (Trade name manufactured by Dainichiseika Colour & Chemicals Mfg. Co., Ltd., ethylene.vinyl acetate resin emulsion), Vinyblan 2682 (acrylic resin emulsion), Vinyblan 2886 (vinyl acetate.acrylic resin emulsion), and Vinyblan 5202 (acrylic acetate resin emulsion) (Trade names, manufactured by Nisshin Chemical Co., Ltd. company), Elitel KA-5071S, KT-8803, KT-9204, KT-8701, KT-8904, and KT-0507 (Trade names, manufactured by Unitika, Ltd., polyester resin emulsion), HI-TECH SN-2002 (Trade name, manufactured by TOHO Chemical Industry Co., Ltd., polyester resin emulsion), TAKELAC W-6020, W-635, W-6061, W-605, W-635, and W-6021 (Trade names, manufactured by Mitsui Chemicals & SKC Polyurethanes Inc., urethane-based resin emulsion), SUPERFLEX 870, 800, 150, 420, 460, 470, 610, and 700 (Trade names, manufactured by Daiichi Kogyo Seiyaku Co., Ltd., polyurethane resin emulsion), PARMARIN UA-150 (manufactured by Sanyo Chemical Industries, Ltd., urethane-based resin emulsion), Sancure 2710 (manufactured by Japanese Lubrizol Corporation., urethane-based resin emulsion), NeoRez R-9660, R-9637, and R-940 (manufactured by Kusumoto Chemicals, Inc., urethane-based resin emulsion), ADEKABON TITER HUX-380 and 290K (manufactured by ADEKA, Inc., urethane-based resin emulsion), Mowinyl 966A and Mowinyl 7320 (manufactured by Nippon Synthetic Chemical Industry Co., Ltd.), Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780 and 7610 (all manufactured by BASF A.G.), NK Binder R-5HN (manufactured by Shin-Nakamura Chemical Co., Ltd.), and the like.

The content in terms of solid content of the resin emulsion in the treatment liquid composition is preferably 1 to 20% by mass, more preferably 1.5 to 15% by mass, and still more preferably 2 to 10% by mass when the total mass of the treatment liquid composition is 100% by mass. When the content in terms of solid content of the resin emulsion is in the ranges mentioned above, the washing durability of an image is further improved. The amount in terms of solid content refers to the amount excluding substances other than the resin (solid content) in the resin emulsion.

When a resin emulsion is compounded in the treatment liquid composition and when a resin emulsion is compounded in the ink composition, both the resin emulsions may be the same type or different types.

1.4.2. Surfactant

The ink composition according to this embodiment may also contain a surfactant. As the surfactant, any one of a nonionic surfactant, an anionic surfactant, a cationic surfactant, and an ampholytic surfactant is usable and the surfactants may be used in combination. The surfactant can reduce the interfacial tension of the treatment liquid composition and can improve the permeability into cloth.

However, when 1% by mass or more of the surfactant is contained in the treatment liquid composition, the interfacial tension excessively decreases, and therefore there is a tendency that the treatment liquid composition easily and deeply permeates into cloth, so that the contact between the treatment liquid composition and the ink composition to be added later is insufficient. It has been found that, when the amount of the surfactant is 2% by mass or more, there is a tendency for the washing durability of a printed article to decrease.

Therefore, when the surfactant is compounded in the treatment liquid composition, the total amount of the surfactants is less than 0.5% by mass, preferably less than 0.1% by mass, more preferably less than 0.05% by mass, and particularly preferably less than 0.01% by mass based on the entire treatment liquid composition. In the treatment liquid composition, the surfactant is an arbitrary component. Even when the surfactant is not contained, the function and the action of the treatment liquid composition can be sufficiently demonstrated.

The nonionic surfactant is preferably at least one kind among an acetylene glycol-based surfactant, an acetylene alcohol-based surfactant, a fluorine based surfactant, and a polysiloxane-based surfactant. Due to the fact that the ink composition contains these surfactants, the wettability to cloth and the dispersion stability of pigments is further improved.

The acetylene glycol-based surfactant and the acetylene alcohol-based surfactant described above are not limited to substances mentioned below and one or more kinds selected from alkylene oxide adducts of 2,4,7,9-tetramethyl-5-decyne-4,7-diol and 2,4,7,9-tetramethyl-5-decyne-4,7-diol, and 2,4-dimethyl-5-decyne-4-ol, alkylene oxide adducts of 2,4-dimethyl-5-decyne-4-ol, 3,6-dimethyl-4-octyne-3,6-diol, 3,5-dimethyl-1-hexyne-3-ol, and 2,4-dimethyl-5-hexyne-3-ol can be mentioned. Moreover, for the acetylene glycol-based surfactant and the acetylene alcohol-based surfactant, commercially-available items are also usable and Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, and GA (all Trade names, manufactured by Air Products and Chemicals. Inc.), Olefin B, Y, P, A, STG, SPC, E1004, E1010, PD-001, PD-002W, PD-003, PD-004, EXP. 4001, EXP. 4036, EXP. 4051, AF-103, AF-104, AK-02, SK-14, and AE-3 (all Trade names, manufactured by Nisshin Chemical Co., Ltd.), Acetylenol E00, E00P, E40, and E100 (all Trade names, manufactured by Kawaken Fine Chemicals Co., Ltd.), and the like are mentioned.

As the fluorine based surfactant, commercially-available items may be used and, for example, Megafac F-479 (manufactured by DIC, Inc.), BYK-340 (manufactured by BYK Chemie Japan), and the like are mentioned.

As the polyorganosiloxane-based surfactant, commercially-available items are usable and, for example, Olefin PD-501, Olefin PD-502, and Olefin PD-570 (all manufactured by Nisshin Chemical Co., Ltd.), BYK-347, BYK-348, and BYK-302 (all manufactured by BYK Chemie), and the like are mentioned.

Both BYK-348 and BYK-302 are siloxane-based surfactants (silicon-based surfactants) and BYK-302 is more suitably usable when compounded in the treatment liquid composition because the capability of reducing the interfacial tension is lower.

As the nonionic surfactant, polyoxyethylene alkyl ether, polyoxyethylene alkyl phenyl ether, alkyl glucoside, polyoxyalkylene glycol alkyl ether, polyoxyalkylene glycol, polyoxyalkylene glycol alkyl phenyl ether, sucrose fatty acid ester, polyoxyethylene fatty acid ester, polyoxyethylene sorbitan fatty acid ester, sorbitan fatty acid ester, polyoxyalkylene acetylene glycol, polyoxyalkylene glycol alkylamine, polyoxyethylene alkylamine, polyoxyethylene alkylamine oxide, fatty acid alkanolamide, alkylol amide, polyoxyethylene polyoxypropylene block polymer, and the like may be used, for example.

Examples of the anionic surfactant include, for example, higher fatty acid salt, soap, α-sulfofatty acid methylester salt, linear alkylbenzenesulfonate, alkyl sulfuric acid ester salt, alkyl ether sulfuric acid ester salt, monoalkyl phosphoric acid ester salt, α-olefin sulfonate, alkylbenzene sulfonate, alkylnaphthalene sulfonate, naphthalene sulfonate, alkane sulfonate, polyoxyethylene alkyl ether sulfuric acid salt, sulfosuccinate, polyoxyalkylene glycol alkyl ether phosphoric acid ester salt, and the like.

Examples of the cationic surfactant include alkyltrimethylammonium salt, dialkyldimethylammonium salt, and alkyldimethylbenzylammonium salt as a quaternary ammonium-based cationic surfactant, N-methylbishydroxyethylamine fatty acid ester hydrochloride as an amine salt-based cationic surfactant, and the like.

Examples of the ampholytic surfactant include alkylaminofatty acid salt as an amino acid-based ampholytic surfactant, alkyl carboxyl betaine as a betaine-based ampholytic surfactant, alkylamine oxide as an amine oxide-based ampholytic surfactant, and the like. The ampholytic surfactant is not limited thereto.

As the surfactant, a mixture of two or more kinds thereof may be used.

1.4.3. Other Components

To the treatment liquid composition of this embodiment, various additives, such as a chelating agent, an antiseptic, a pH adjuster, a viscosity modifier, an antioxidant, and an antifungal agent, can be added as appropriate, as necessary.

1.4.4. Physical Properties of Treatment Liquid Composition

From the viewpoint of achieving appropriate permeability into cloth, the surface tension at 25° C. of the treatment liquid composition according to this embodiment is 30 mN/m or more, preferably 35 mN/m or more, more preferably 38 mN/m or more, and still more preferably 40 mN/m or more. The measurement of the surface tension can be achieved by confirming the surface tension when a platinum plate is soaked with the composition in a 25° C. environment using an automatic surface tension meter CBVP-Z (manufactured by Kyowa Interface Science Co., LTD.).

The treatment liquid composition may be caused to adhere to cloth by an ink jet method. In such a case, the viscosity at 20° C. is preferably set to 1.5 mPa·s or more and 15 mPa·s or less, more preferably set to 1.5 mPa·s or more and 5 mPa·s or less, and still more preferably 1.5 mPa·s or more and 3.6 mPa·s or less.

On the other hand, the treatment liquid composition may be caused to adhere to cloth by methods other than the ink jet method. Examples of such a method include either a non-contact type method or a contact type method, such as a method including applying the treatment liquid composition to cloth using various types of sprays, a method including dipping cloth in the treatment liquid composition for applying the treatment liquid, and a method including applying the treatment liquid to cloth with a brush or the like, or a method containing the combination of the methods.

When the treatment liquid composition is caused to adhere to cloth by such methods other than the ink jet method, the viscosity at 20° C. may be higher than that in the case of using the ink jet method and, for example, is set to 1.5 mPa·s or more and 100 mPa·s or less, preferably set to 1.5 mPa·s or more and 50 mPa·s or less, and more preferably set to 1.5 mPa·s or more and 20 mPa·s or less. The measurement of the viscosity can be achieved by increasing the Shear Rate to 10 to 1000 in a 20° C. environment, and then reading the viscosity at the Shear Rate of 200 using a viscoelasticity tester MCR-300 (manufactured by Pysica).

2. Ink Composition

The treatment liquid composition of this embodiment is used for a printing method performed by causing an ink composition to adhere to cloth by an ink jet method. The treatment liquid composition according to this embodiment is caused to adhere to cloth, and then an ink composition is caused to adhere to the cloth by an ink jet method. Hereinafter, the ink composition is described.

2.1. Pigment

The ink composition of this embodiment contains at least a pigment. Due to the fact that the pigment is caused to adhere to cloth, the cloth is printed, so that a printed article is formed.

The pigment is not particularly limited and both inorganic pigments and organic pigments are usable. Usable as the pigment are, for example, organic pigments, such as, azo-based pigments, phthalocyanine-based pigments, condensed polycyclic pigments, nitro-based pigments, nitroso-based pigments, hollow resin particles, and polymer particles (Brilliant carmine 6B, Lake red C, Watchung red, Disazo yellow, Hansa yellow, Phthalocyanine blue, Phthalocyanine green, Alkali blue, Aniline black, and the like); inorganic pigments, such as metals, such as cobalt, iron, chromium, copper, zinc, lead, titanium, vanadium, manganese, and nickel, metal oxides and sulfides, such as titanium oxide, zinc oxide, antimony oxide, zinc sulfide, and zirconium oxide, carbon black (C.I. Pigment Black 7), such as furnace carbon black, lamp black, acetylene black, and channel black, and yellow ocher, ultramarine, and iron blue pigments.

Examples of carbon black to be used as a black pigment include No. 2300, No. 900, MCF88, No. 33, No. 40, No. 45, No. 52, MA7, MA8, MA100, No. 2200B, and the like (all manufactured by Mitsubishi Chemical Corporation), Raven 5750, Raven 5250, Raven 5000, Raven 3500, Raven 1255, Raven 700, and the like (all manufactured by Columbian Carbon Corp.), Regal 400R, Regal 330R, Regal 660R, Mogul L, Monarch 700, Monarch 800, Monarch 880, Monarch 900, Monarch 1000, Monarch 1100, Monarch 1300, Monarch 1400, and the like (all manufactured by Cabot Corporation company), Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all manufactured by Degussa), and the like.

Examples of white pigments include C.I. Pigment White 1 (Basic lead carbonate), 4 (zinc oxide), 5 (mixture of zinc sulfide and barium sulfate), 6 (titanium oxide), 6:1 (titanium oxide containing other metal oxides), 7 (zinc sulfide), 18 (calcium carbonate), 19 (clay), 20 (mica titanium), 21 (barium sulfate), 22 (natural barium sulfate), (gloss white), 24 (alumina white), 25 (gypsum), 26 (magnesium oxide-.silicon oxide), 27 (silica), 28 (anhydrous calcium silicate), and the like.

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180 and the like.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50 and the like.

Examples of cyan pigments include C.I. Pigment Blue 1, 2, 3, 15, 15:1, 15:2, 15:3, 15:34, 15:4, 16, 18, 22, 25, 60, 65, and 66, C.I. Vat Blue 4 and 60, and the like.

Examples of pigments other than the black, white, yellow, magenta, and cyan pigments include, for example, C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63, and the like.

These pigments mentioned above as examples may be used as a mixture of two or more kinds thereof. The total content of the pigments (solid content) in the ink composition varies depending on the pigment type to be used and is preferably 1 to 30% by mass and more preferably 2 to 15% by mass when the total mass of the ink composition is 100% by mass from the viewpoint of obtaining good color development properties.

When an ink composition is prepared, a pigment dispersion liquid in which a pigment is dispersed beforehand may be prepared, and then the pigment dispersion liquid may be added to an ink composition. Examples of methods for obtaining such a pigment dispersion liquid include a method including dispersing a self-dispersible pigment in a dispersion medium without using a dispersant, a method including dispersing a pigment in a dispersion medium using a polymer dispersant, a method including dispersing a surface-treated pigment in a dispersion medium, and the like.

When pigment printing using the white pigment is performed, e.g., when colored cloth is printed, the tendency that the color development properties are insufficient (white degree is insufficient) is high. However, when the ink composition of this embodiment is a white ink composition containing the white pigment, very excellent color development properties in a printed article can be achieved due to a permeability reducing effect obtained by the treatment liquid composition and an aggregation effect of the pigment.

2.2. Other Components 2.2.1. Water

The ink composition of this embodiment may also contain water. The water is the same as that described in the treatment liquid composition. The content of the water is 30% by mass or more, preferably 40% by mass or more, more preferably 45% by mass or more, and still more preferably 50% by mass or more based on the total amount of the ink composition. When the water in the ink composition is referred to, a pigment dispersion liquid and a resin particle dispersion liquid to be used as raw materials and water to be added are included, for example. Due to the fact that the content of the water is 30% by mass or more, the viscosity of the ink composition can be made relatively low. The upper limit of the content of the water is preferably 90% by mass or less, more preferably 85% by mass or less, and still more preferably 80% by mass or less based on the total amount of the treatment liquid composition. In this specification, when an "aqueous ink" is referred to, an ink containing 30% by mass or more of water based on the total ink mass (100% by mass) is referred to.

2.2.2. Water-Soluble Organic Solvent

The ink composition of this embodiment may also contain a water-soluble organic solvent. Due to the fact that a water-soluble organic solvent is contained, the ejection stability by an ink jet method of the ink composition is made excellent and moisture evaporation from a recording head due to being left for a long period of time can be effectively prevented.

Examples of the water-soluble organic solvent include a polyol compound, glycol ether, a betaine compound, and the like, for example.

Examples of the polyol compound include polyol compounds (preferably diol compounds) in which the number of carbon atoms in the molecules is 2 or more and 6 or less and which may have one ether bond in the molecules and the like, for example. Specific examples of the polyol compounds include glycols, such as diethylene glycol, triethylene glycol, polyethylene glycol, propylene glycol, dipropylene glycol, triproyleneglycol, polypropylene glycol, polyoxyethylene polyoxypropylene glycol, methyl triglycol (triethylene glycol monomethylether), butyl triglycol (triethylene glycol monobutylether), butyl diglycol (diethylene glycol monobutylether), dipropylene glycol monopropylether, glycerol, 1,2-hexanediol, 1,2-heptanediol, 1,3-propanediol, 1,2-butanediol, 1,3-butanediol, 1,4-butanediol, 2,3-butanediol, 2-methyl-3-phenoxy-1,2-propanediol, 3-(3-methylphenoxy)-1,2-propanediol, 3-hexyloxy-1,2-propanediol, 2-hydroxymethyl-2-phenoxymethyl-1,3-propanediol, 3-methyl-1,3-butanediol, 1,3-propanediol, 1,2-butanediol, 1,2-pentanediol, 1,4-butanediol, 1,5-pentanediol, 1,6-hexanediol, 2-methyl-2,4-pentanediol, and 3-methyl-1,5-pentanediol.

As glycol ethers, monoalkyl ethers of glycols selected from ethylene glycol, diethylene glycol, triethylene glycol, polyethylene glycol, propylene glycol, dipropylene glycol, tripropyleneglycol, polypropylene glycol, and polyoxyethylene polyoxypropylene glycol are preferable, for example. More preferably, triethylene glycol monomethylether, triethylene glycol monobutylether, dipropylene glycol monopropylether, and the like are mentioned.

The betaine compound is a compound (intramolecular salt) which has a positive charge and a negative charge at positions which are not adjacent to each other in the same molecule, in which a dissociable hydrogen atom is not bonded to an atom having a positive charge, and which has no charges as the entire molecule. The betaine compound is preferably an N-alkyl substitution product of amino acid and more preferably an N-trialkyl substitution product of amino acid. Examples of the betaine compound include, for example, trimethyl glycine (also referred to as "glycine betaine"), γ-butyrobetaine, homarine, trigonelline, carnitine, homoserine betaine, valine betaine, lysine betaine, ornithine betaine, alanine betaine, stachydrine, glutamic-acid betaine, and the like and trimethyl glycine and the like can be preferably mentioned.

As the water-soluble organic solvent, a pyrrolidone derivative may be used. Examples of the pyrrolidone derivative include, for example, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like.

Two or more kinds of the water-soluble organic solvents may be mixed for use. The total compounding amount of the water-soluble organic solvents is 0.2% by mass or more and 30% by mass or less, preferably 0.4% by mass or more and 20% by mass or less, more preferably 0.5% by mass or more and 15% by mass or less, and still more preferably 0.7% by mass or more and 10% by mass or less in total based on the total amount of the ink composition from the viewpoint of viscosity adjustment of the ink composition and prevention of clogging due to a moisturizing effect.

2.2.3. Surfactant

The ink composition of this embodiment may also contain a surfactant. As the surfactant, any one of a nonionic surfactant, an anionic surfactant, a cationic surfactant, and an ampholytic surfactant is usable and the surfactants may be used in combination. The surfactant can reduce the interfacial tension of the ink composition and can improve the permeability into cloth. Specific examples of the surfactant are the same as those mentioned in the section of the treatment liquid composition described above.

It has been found that, even when 0.1% by mass or more of the surfactant is compounded in the ink composition, the washing durability of a printed article is hard to decrease, unlike the treatment liquid composition. Therefore, when the surfactant is compounded in the ink composition, it is preferable to compound the surfactant in a proportion of 0.01% by mass or more and 3% by mass or less, preferably 0.05% by mass or more and 2% by mass or less, more preferably 0.1% by mass or more and 1% by mass or less, and particularly preferably 0.2% by mass or more and 0.5% by mass or less in total of the surfactants based on the entire ink composition.

When the ink composition contains the surfactant, there is a tendency for the stability when ink is ejected from a head to increase. Moreover, the use of an appropriate amount of the surfactant can improve the permeability into cloth and can increase the contact with the treatment liquid composition. Thus, the aggregation of the pigment and the thickening of the ink composition easily occur, so that the color development properties and the washing durability of a printed article can be further improved. When the surfactant is added into an ink in an amount exceeding an appropriate amount, the excessive surfactant oozes out after printing, which adversely affects the washing durability of a printed article.

2.2.4. Chelating Agent

The ink composition of this embodiment may also contain a chelating agent. The chelating agent has a property of capturing an ion. Examples of such a chelating agent include, for example, ethylenediaminetetraacetic acid salt (EDTA), nitrilotriacetic acid salt of ethylene diamine, hexametaphosphoric acid salt, pyrophoric acid salt, metaphosphoric acid salt, and the like.

2.2.5. Antiseptic

The ink composition of this embodiment may contain an antiseptic. Due to the fact that an antiseptic is contained, multiplication of mold or bacteria can be prevented and the storageability of the ink composition is further improved. Thus, the ink composition is easily used as a maintenance liquid for maintenance of a printer, which is not used for a long period of time, for example. As preferable examples of the antiseptic, Proxel CRL, Proxel BDN, Proxel GXL, Proxel XL-2, Proxel IB, or Proxel TN can be mentioned.

2.2.6. PH Adjuster

The ink composition of this embodiment may contain a pH adjuster. Due to the fact that a pH adjuster is contained, elution of impurities from a member forming an ink flow passage can be prevented or promoted, and thus the cleaning performance of the ink composition can be adjusted, for example. As the pH adjuster, morpholines, piperazines, and aminoalcohols, such as triethanol amine, can be mentioned, for example.

2.2.7. Other Components

The ink composition according to this embodiment may contain the resin emulsion described in the section "1.4. Other components" described above and can further contain various additives, such as a moisturizer, a viscosity modifier, a dissolution assistant, an antioxidant, and an antifungal agent as appropriate.

2.2.8. Physical Properties of Ink Composition

The ink composition according to this embodiment is given to cloth by an ink jet method. Therefore, the ink composition has surface tension at 25° C. of preferably 10 mN/m or more and 40 mN/m or less and more preferably 25 mN/m or more and 40 mN/m or less from the viewpoint of the balance between the record quality and the reliability as an ink jet recording ink.

From the same viewpoint, the viscosity at 20° C. of the ink composition is preferably 2 mPa·s or more and 15 mPa·s or less, more preferably 2 mPa·s or more and 5 mPa·s or less, and still more preferably 2 mPa·s or more and 3.6 mPa·s or less.

3. Printing Method

The treatment liquid composition and the ink composition described above are suitably usable for printing (pigment printing). The printing method of this embodiment includes a process of causing the treatment liquid composition containing water, 1,2-alkanediol, and an aggregating agent to adhere to cloth and a process of causing the ink composition containing a pigment to adhere to the cloth by an ink jet method. The process of causing the ink composition to adhere may include giving the ink composition by an ink jet method to at least part of a region to which the treatment liquid composition is given.

Hereinafter, the printing method according to this embodiment is described in order of the cloth and the printing method.

3.1. Cloth

The printing method according to this embodiment is performed using cloth. Raw materials forming the cloth are not particularly limited and, for example, natural fibers, such as cotton, hemp, wool, and silk, synthetic fibers, such as polypropylene, polyester, acetate, triacetate, polyamide, and polyurethane, biodegradable fibers, such as polylactic acid, and the like and mixed fibers thereof may be acceptable. The cloth may be any one obtained by forming the fibers mentioned above into textiles, knitted substances, or nonwoven fabric. The cloth to be used in this embodiment is more preferably one formed with fibers containing cellulose, such as cotton and hemp, among the above. By the use of such cloth, more excellent fixability of the pigment can be obtained.

The weight per unit area of the cloth to be used in this embodiment is in the range of 1.0 oz (ounce) or more and 10.0 oz or less, preferably 2.0 oz or more and 9.0 oz or less, more preferably 3.0 oz or more and 8.0 oz or less, and still more preferably 4.0 oz or more and 7.0 oz or less. In the printing method of this embodiment, since the treatment liquid composition described above is used, the aggregating agent can be appropriately arranged when the treatment liquid composition is given to the cloth of the weight per unit area in such ranges. Therefore, good pigment printing is realizable. In other words, when the weight per unit area of the cloth is in such ranges, the treatment liquid composition described above can be sufficiently applied, and thus good printing can be performed by the printing method of this embodiment. Furthermore, the printing method of this embodiment employs the treatment liquid composition described above, and therefore can be applied to a plurality of kinds of cloth different in weight per unit area, and thus good printing can be performed.

3.2. Printing Method

Next, the printing method according to this embodiment is described in each process.

3.2.1. Process of Causing Treatment Liquid Composition to Adhere to Cloth

A process of causing a treatment liquid composition to adhere to cloth is a processing of giving the treatment liquid composition described above to at least part of the cloth.

In this process, the treatment liquid composition is given so that the adhesion amount of the treatment liquid composition is preferably 100 mg/inch$^2$ or more and 3000 mg/inch$^2$ or less, more preferably 130 mg/inch$^2$ or more and 1500 mg/inch$^2$ or less, and still more preferably 193 mg/inch$^2$ or more and 500 mg/inch$^2$ or less. By setting the adhesion amount of the treatment liquid composition to 0.02 g/cm$^2$ or more, the treatment liquid composition is easily and uniformly applied to cloth, and therefore color unevenness of an image can be prevented. By setting the adhesion amount of the treatment liquid composition to 0.5 g/cm$^2$ or less, blurring of an image can be prevented.

In this process, the treatment liquid composition is given so that the adhesion amount of the aggregating agent contained in the treatment liquid composition given to cloth is preferably 7.5 µmol/cm$^2$ or more and 40 µmol/cm$^2$ or less and more preferably 12 µmol/cm$^2$ or more and 30 µmol/cm$^2$ or less. By giving the treatment liquid composition so that the adhesion amount of the aggregating agent is 10 µmol/cm$^2$ or more, the color development properties of an image to be recorded are improved. By giving the treatment liquid composition so that the adhesion amount of the aggregating agent is 40 µmol/cm$^2$ or less, the washing durability of an image to be recorded is further improved.

Examples of methods for giving a treatment liquid composition to cloth include, for example, a method including dipping cloth into a treatment liquid composition (dip coating), a method including applying a treatment liquid composition with a spatula, a roller, a brush, a roll coater, or the like (roller coating), a method including ejecting a treatment liquid composition with a spraying device or the like (spray coating), a method including ejecting a treatment liquid composition by an ink jet system (ink jet coating), and the like and any method may be used. Among the above, it is preferable to use contact or non-contact type methods, such as dip coating, roller coating, and spray coating from the viewpoint that the apparatus configuration is simple and a treatment liquid composition can be promptly applied, and these methods may be combined.

The printing method according to this embodiment may include a treatment liquid composition drying process of drying the treatment liquid composition given to the cloth after the process of causing the treatment liquid composition to adhere. The drying of the treatment liquid composition may be performed by natural drying and is preferably drying involving heating from the viewpoint of improving the drying rate. When the treatment liquid composition drying process involves heating, the heating method is not particularly limited and a heat pressing method, a normal pressure steam method, a high pressure steam method, and a thermofixing method are mentioned, for example. The heating source of the heating is not limited and an infrared ray (lamp) is mentioned, for example.

3.2.2. Process of Causing Ink Composition to Adhere to Cloth by Ink Jet Method

A process of causing an ink composition to adhere to cloth by an ink jet method is a process of giving the ink composition by an ink jet method to at least part of the region to which the treatment liquid composition is given by the process of causing the treatment liquid composition to adhere described above. Thus, the components, such as a pigment, contained in the ink composition and the aggregating agent react with each other, whereby the components, such as a pigment, aggregate on the cloth, and therefore an image having excellent color development properties is obtained. Furthermore, the treatment liquid composition is used in which the concentration of the aggregating agent is within a specific range and which hardly contains or does not contain a surfactant, and therefore the washing durability of an image to be recorded is also improved.

This process includes discharging liquid droplets of the ink composition from a nozzle of an ink jet recording head, and causing the liquid droplets to adhere to cloth to thereby print an image on the cloth. Thus, a printed article having an image containing the ink composition printed on cloth is obtained.

The ink jet recording system of discharging the ink composition may be any system and a charge deflection system, a continuous system, and an on-demand system (a piezoelectric system, a bubble jet (Registered Trademark) system) and the like are mentioned. Among the ink jet recording systems, a system employing a piezoelectric ink jet recording apparatus is preferable.

In this process, the ink composition is applied to cloth so that the adhesion amount is preferably 1.5 mg/cm$^2$ or more and 6 mg/cm$^2$ or less and more preferably 2 mg/cm$^2$ or more and 5 mg/cm$^2$ or less. Due to the fact that the adhesion amount of the ink composition is 1.5 mg/cm$^2$ or more, there is a tendency for the color development properties of an image to be recorded to be improved. Due to the fact that the adhesion amount of the ink composition is 6 mg/cm$^2$ or less, the drying properties of an image to be recorded are improved, so that blurring of an image can be prevented.

3.2.3. Heating Process

The printing method according to this embodiment may contain a heating process of heating the ink composition (image) given to cloth.

A heating method for heating the ink composition given to cloth is not particularly limited and, for example, a heat pressing method, a normal pressure steam method, a high pressure steam method, and a thermofixing method are mentioned. The heating source of the heating is not limited and an infrared ray (lamp) is mentioned, for example.

The heating temperature when heating the ink composition given to cloth is not particularly limited and is preferably 150° C. or more and 200° C. or less and more preferably 160° C. or more and 180° C. or less. Due to the fact that the heating temperature is within the ranges mentioned above, damages of the cloth can be reduced or the film formation of the resin contained in the ink composition can be promoted. The heating temperature in this heating process refers to the temperature of the surface of an image formed on the cloth and, for example, can be measured using a noncontact thermometer (Trade name "IT2-80", manufactured by KEYENCE). The heating time can be set to 30 seconds or more and 20 minutes or less, for example, but is not particularly limited thereto.

4. Operational Effects

The treatment liquid composition of this embodiment contains 1,2-alkanediol, and thus the surface tension is moderate. Therefore, when caused to adhere to cloth, the treatment liquid composition can be stabilized in a state where the permeability into cloth is moderate. Thus, even when there is variation in the form and the lot of cloth, the aggregating agent can be caused to remain at a good position for the adhesion of the ink composition. Therefore, when the ink composition adheres to the cloth to which the treatment liquid composition is caused to adhere, a printed article having excellent color development properties can be formed. Moreover, according to the treatment liquid composition, 1,2-alkanediol is contained, and therefore washing durability can also be satisfactorily maintained without reduction.

According to the printing method of this embodiment, the treatment liquid composition containing 1,2-alkanediol and having moderate surface tension is used, and therefore the treatment liquid composition can be stabilized in a state where the permeability into the cloth of the treatment liquid composition is moderate by the process of causing the same to adhere to the cloth. Thus, even when there is variation in the form and the lot of the cloth, the aggregating agent contained in the treatment liquid composition can be caused to remain at a good position for the adhesion of the ink composition. Therefore, by performing the process of causing the ink composition to adhere to the cloth to which the treatment liquid composition is caused to adhere, a printed article having excellent color development properties can be formed. Moreover, the treatment liquid composition containing 1,2-alkanediol is used according to the printing method, the washing durability of a printed article to be obtained can also be improved.

5. Examples and Comparative Examples

Hereinafter, the invention is more specifically described with reference to Examples but the invention is not limited to Examples.

5.1. Preparation of Ink Composition

Each component was placed in a vessel so as to have the composition shown in Table 1, mixed and stirred with a magnetic stirrer for 2 hours, and then subjected to dispersion treatment in a bead mill filled with zirconia beads having a diameter of 0.3 mm to be sufficiently mixed. After stirring for 1 hour, the mixture was filtered using a 5 μm PTFE membrane filter to obtain each ink composition. The numerical values in Table 1 show % by mass and pure water (ion exchanged water) was added so that the mass of each ink composition was 100% by mass.

TABLE 1

| Ink composition name | W1 | C1 |
|---|---|---|
| Titanium dioxide slurry | 45 | — |
| Cyan pigment dispersion liquid | — | 30 |
| TAKELAC W6021 | 30 | 17 |
| 2-pyrolidone | 2 | 2 |
| Glycerol | 10 | 17 |
| Triethylene glycol | 1 | 4 |
| Triethylene glycol monobutylether | 1 | 1 |
| BYK-348 | 0.3 | 0.3 |
| Ion exchanged water | Balance | Balance |
| Total | 100 | 100 |

In Table 1, as titanium dioxide slurry, NanoTek® Slurry (manufactured by C.I. KASEI CO., LTD., Trade name, Titanium dioxide solid content of 20%, Average particle diameter of 250 nm, and Solid content concentration of 20%) was used (Since % by mass of the titanium dioxide slurry liquid is shown in Table 1, the concentration of the titanium dioxide in an ink composition W1 is 9% by mass.). Moreover, TAKELAC W6021 is a urethane-based resin emulsion manufactured by Mitsui Chemicals, Inc. and has a solid content concentration of 30% (Since Table 1 shows % by mass of the urethane-based resin emulsion liquid, the solid content concentration of the urethane-based resin in the ink composition W1 is 9% by mass and the solid content concentration of the urethane-based resin in an ink composition C1 is 5.1% by mass.). For the cyan pigment dispersion liquid, a substance was used which was obtained by mixing 65 parts of C.I. Pigment Blue 15:3 as a cyan pigment with 35 parts of Joncryl 611 (Trade name: manufactured by Basf Japan, Inc.) which is a styrene-acrylic acid-based dispersion resin, 1.70 parts of potassium hydroxide, and 250 parts of ultrapure water refined by an ion exchanging method and a reverse osmosis method, performing dispersion in a ball mill with zirconia beads for 10 hours, filtering the resultant mixture through a glass fiber filter GA-100 (Trade name: manufactured by Advantec Toyo Kaisha, Ltd.) to remove coarse particles, and then adjusting the pigment concentration to be 15% by mass (Since % by mass of the cyan pigment dispersion liquid is shown in Table 1, the concentration of the cyan pigment in the ink composition C1 is 9% by mass.). BYK-348 is a siloxane-based surfactant manufactured by BYK Chemie Japan. For other components indicated by the compound name, substances purchased as reagents were used.

5.2. Preparation of Treatment Liquid Composition

Each component was placed in a vessel so as to have the composition shown in Table 2, mixed and stirred with a magnetic stirrer for 2 hours, and then subjected to dispersion treatment in a bead mill filled with zirconia beads having a diameter of 0.3 mm to be sufficiently mixed. After stirring for 1 hour, the mixture was filtered using a 5 μm PTFE membrane filter to obtain each treatment liquid. The numerical values in Table 2 show % by mass and pure water (ion exchanged water) was added so that the mass of each treatment liquid was 100% by mass.

As the aggregating agent, calcium nitrate was used. As the resin emulsion, Mowinyl 966A (manufactured by Nippon Synthetic Chemical Industry Co., Ltd., Solid content concentration of 45%) which is a urethane-based resin emulsion was used (Since Table 2 shows % by mass of the urethane-based resin emulsion liquid, the solid content concentration of the urethane-based resin in the treatment liquid composition is 2.25% by mass.).

TABLE 2

| | | Examples | | | | | | |
|---|---|---|---|---|---|---|---|---|
| | | 1 | 2 | 3 | 4 | 5 | 6 | 7 |
| Treatment liquid composition | Calcium nitrate | 15 | 15 | 15 | 15 | 15 | 15 | 15 |
| | Mowinyl 966A | 5 | 5 | 5 | 5 | 5 | 5 | 5 |
| | 1,2-hexanediol | 2 | — | — | — | 0.5 | 10 | 2 |
| | 1,2-octanediol | — | 2 | — | — | — | — | — |
| | 1,2-decanediol | — | — | 2 | — | — | — | — |
| | 1,2-dodecanediol | — | — | — | 2 | — | — | — |
| | 1,6-hexanediol | — | — | — | — | — | — | — |
| | Glycerol | 5 | 5 | 5 | 5 | 5 | 5 | 5 |
| | BYK302 | — | — | — | — | — | — | 0.01 |
| | Water | Balance | Balance | Balance | Balance | Balance | Balance | Balance |
| | Total | 100 | 100 | 100 | 100 | 100 | 100 | 100 |
| | Surface tension mN/m | 39.8 | 40.6 | 41.5 | 41.6 | 41.8 | 38.7 | 38.3 |
| Evaluation test | Printed article uniformity | ○ | ○ | ○ | ○ | ○ | ○ | ○ |
| | Adaptability to variation in medium T-shirt A | ○ | ○ | ○ | ○ | ○ | ○ | ○ |
| | T-shirt B | ○ | ○ | ○ | ○ | ○ | ○ | ○ |
| | T-shirt C | ○ | ○ | △ | △ | ○ | ○ | ○ |
| | Washing T-shirt A | ○ | ○ | ○ | ○ | ○ | ○ | ○ |

TABLE 2-continued

| | | 8 | 9 | 10 | 11 | Comp. 1 | Comp. 2 | Comp. 3 |
|---|---|---|---|---|---|---|---|---|
| durability (Washing test) | T-shirt B | ○ | ○ | ○ | ○ | ○ | ○ | ○ |
| | T-shirt C | ○ | ○ | ○ | Δ | ○ | ○ | ○ |

| | | Examples | | | | Comparative Examples | | |
|---|---|---|---|---|---|---|---|---|
| | | 8 | 9 | 10 | 11 | 1 | 2 | 3 |
| Treatment liquid composition | Calcium nitrate | 15 | 15 | 15 | 15 | 15 | 15 | 15 |
| | Mowinyl 966A | 5 | 5 | 5 | 5 | 5 | 5 | 5 |
| | 1,2-hexanediol | 2 | 2 | 15 | 0.3 | — | — | — |
| | 1,2-octanediol | — | — | — | — | — | — | — |
| | 1,2-decanediol | — | — | — | — | — | — | — |
| | 1,2-dodecanediol | — | — | — | — | — | — | — |
| | 1,6-hexanediol | — | — | — | — | 2 | — | — |
| | Glycerol | 5 | 5 | 5 | 5 | 5 | 5 | 5 |
| | BYK302 | 0.1 | 0.5 | — | — | — | — | 0.5 |
| | Water | Balance | Balance | Balance | Balance | Balance | Balance | Balance |
| | Total | 100 | 100 | 100 | 100 | 100 | 100 | 100 |
| | Surface tension mN/m | 33.5 | 27.5 | 38.2 | 42.5 | 41.9 | 41.7 | 27.3 |
| Evaluation test | Printed article uniformity | ○ | ○ | ○ | Δ | X | X | X |
| | Adaptability to T-shirt A | ○ | ○ | ○ | ○ | Δ | X | ○ |
| | variation in T-shirt B | ○ | Δ | ○ | Δ | X | X | X |
| | medium T-shirt C | Δ | Δ | Δ | Δ | X | X | X |
| | Washing T-shirt A | ○ | ○ | ○ | ○ | ○ | ○ | Δ |
| | durability T-shirt B | ○ | Δ | Δ | ○ | Δ | ○ | Δ |
| | (Washing test) T-shirt C | Δ | Δ | Δ | ○ | Δ | ○ | X |

5.3. Evaluation Test 5.3.1. Cloth

As a printing test cloth, the following three kinds of cloth were prepared.

T-shirt A: GILDAN Ultra cotton (black) 6.1 oz Thick type
T-shirt B: Printstar Lightweight (black) 5.6 oz Somewhat thick type
T-shirt C: Printstar Lightweight (black) 4.0 oz Somewhat thin type 5.3.2. Printed Article Uniformity Test The printed article uniformity was evaluated using the T-shirt B. Each treatment liquid composition was diluted twice with pure water, and then sufficiently impregnated into a sponge roller. Then, the roller was rolled 3 to 4 times in each of the vertical direction and the horizontal direction to the T-shirt B, whereby each treatment liquid composition was applied as uniformly as possible.

The application amount was about 20 g per area of the A4 size. The T-shirt B to which each treatment liquid composition was applied was heat treated at 165° C. for 45 seconds by heat press for drying. On the T-shirt B after drying, printing was performed using a printer manufactured by Seiko Epson Corp. (SC-F200) with the white ink composition (W1) at a resolution set to 1440 dpi×1440 dpi with an application amount of 200 mg/inch². After the printing, heat treatment at 165° C. for 45 seconds was performed again by heat press to fix printed matter. Then, the results obtained by visually observing the printed surface after the fixing to evaluate the same according to the following criteria were shown in Table 2.

○: White printing is finely uniform.
Δ: Density unevenness is slightly conspicuous.
x: Density unevenness is conspicuous.

5.3.3. Test of Adaptability to Variation in Medium

White printing was carried out to each of the T-shirt A, the T-shirt B, and the T-shirt C by the same printing method as that of the printed article uniformity test above.

The printed surface after the white printing was subjected to color measurement using a colorimeter (Spectrolino) manufactured by Gretag to measure L*. Then, the L* was evaluated according to the following criteria as the index of the whiteness. The results are shown in Table 2.

○: L* is 85 or more
Δ: L* is 80 or more and less than 85.
x: L* is less than 80.

Herein, as the evaluation of the adaptability to variation in medium, the case where the color development varies in the T-shirts of three kinds of thickness is judged to be poor and the case where the color development is uniform in the T-shirts of three kinds of thickness is judged to be good.

5.3.4. Wash Durability Test

A T-shirt A, a T-shirt B, and a T-shirt C were prepared by the same printing method as that of the printed article uniformity test above, and then printing of white+cyan was performed using a printer (SC-F200) manufactured by Seiko Epson Corp. The conditions of printing by a white ink composition were the same as those of the printed article uniformity test. As the conditions of printing by a cyan-ink composition, the resolution was set to 1440 dpi×1440 dpi and the application amount was set to 10 mg/inch². After the printing, heat treatment at 45 seconds for 165° C. was performed again by heat press to fix printed matter. Each printed T-shirt was evaluated according to "AATCC61 2A". The results evaluated according to the following criteria were shown in Table 2.

○: 4 to 5 grade or more
Δ: 4 grade
x: 3 to 4 grade or less 5.4. Evaluation Results The treatment liquid composition of each Example contained 1,2-alkanediol and obtained good results in all of the printed article uniformity, the adaptability to variation in medium, and the washing durability.

On the other hand, when the results of Comparative Example 1 using a treatment liquid composition containing 1,6-hexanediol in place of 1,2-alkanediol are referred to, the printed article uniformity was poor and the adaptability (adaptability to the thickness of T-shirts) to variation in medium was also inferior. The adaptability to variation in medium evaluates the color development of the ink composition of each cloth (T-shirt). The adaptability when the color development does not vary depending on cloth is good and the adaptability when the color development varies depending on cloth is poor. In Comparative Example 1, the washing durability was almost maintained. This is considered to be because a surfactant was not compounded in the treatment liquid composition.

When Comparative Example 2 not containing 1,2-alkanediol was referred to, it was found that the printed article uniformity and the adaptability to variation in medium (color development properties (whiteness)) were also inferior. This is considered to be because a component serving as a penetrant was not contained in the treatment liquid composition and the treatment liquid composition was not able to be uniformly applied and the ink composition was not able to finely react.

When Comparative Example 3 not containing 1,2-alkanediol but containing a surfactant is referred to, the printed article uniformity was inferior and the adaptability to variation in medium was also poor. This can be presumed to result from the difference in permeability depending on the thickness of cloth. Furthermore, it is considered in Comparative Example 3 that the adhesiveness between the cloth and the pigment deteriorated due to the presence of a surfactant and the washing durability was also inferior.

When Examples 7 to 9 are referred to, it was found that, when both 1,2-alkanediol and a surfactant were compounded in the treatment liquid composition, good results were obtained in each test when the compounding amount of the surfactant was 0.5% by mass or less. When Example 9 and Comparative Example 3 are referred to, even when a surfactant was compounded, the washing durability was not very poor in Example 9. When Example 9 is referred to, the adaptability to variation in medium to the thin T-shirt was slightly inferior. This is considered to result from a reduction in surface tension due to a surfactant.

The results of Examples 10 and 11 showed that the upper limit and the lower limit of the compounding amount of 1,2-alkanediol were about 15% by mass and 0.3% by mass, respectively. The T-shirts of Example 10 were slightly inferior in drying properties after printing due to the fact that the amount of 1,2-hexanediol was large.

In Comparative Example 3, since the adaptability to variation in medium is very poor (x and ○ arise depending on the type of cloth), recorded matter with poor color development is suddenly generated when various kinds of cloth are used, for example. Therefore, Comparative Example is not preferable for performing stable printing. When the color development properties themselves are inferior but the adaptability to variation in medium is not so poor as in Comparative Examples 1 and 2 (when there is x but there are no results greatly different from x, such as ○, depending on the type of cloth), it is considered that the problem can be addressed by varying the printing conditions beforehand, for example.

The invention is not limited to the above-described embodiment, and can be modified in various manners. For example, the invention includes the substantially same structure (e.g., structure with same function(s), method(s), and result(s) or structure with the same object(s) and effect(s)) as the structures described with the embodiment. The invention also includes a structure in which non-essential portions of the structures described in the embodiments are replaced. The invention also includes a structure that can demonstrate the same effects or a structure that can achieve the same objects as those in the structures described with the embodiment. The invention also includes a structure in which known techniques are added to the structures described in the embodiment.

The entire disclosure of Japanese Patent Application No. 2016-076549, filed Apr. 6, 2016 is expressly incorporated by reference herein.

What is claimed is:

1. A treatment liquid composition comprising:
   water;
   a resin emulsion that is at least one of a urethane-based resin emulsion, a styrene acryl-based resin emulsion, an acryl-based resin emulsion, and a vinyl chloride-vinyl acetate-based resin emulsion;
   1,2-alkanediol; and
   an aggregating agent aggregating or thickening a component of an ink composition containing a pigment, wherein
   the treatment liquid composition is used for a printing method performed by causing the ink composition to adhere to cloth by an ink jet method.

2. The treatment liquid composition according to claim 1, wherein
   1,2-alkanediol having carbon atoms of 4 or more and 9 or less is contained as the 1,2-alkanediol.

3. The treatment liquid composition according to claim 1, wherein
   a content of a surfactant in the treatment liquid composition is 0.05% by mass or less.

4. The treatment liquid composition according to claim 1, wherein
   a surface tension of the treatment liquid composition at 25° C. is 38 mN/m or more.

5. The treatment liquid composition according to claim 1, wherein
   a content of the 1,2-alkanediol is 0.5% by mass or more and 10% by mass or less.

6. The treatment liquid composition according to claim 1, wherein
   the ink composition is a white ink composition containing a white pigment.

7. The treatment liquid composition according to claim 1, wherein
   a weight per unit area of the cloth is in a range of 3.0 oz or more and 8.0 oz or less.

8. The treatment liquid composition according to claim 1, which is used for two or more kinds of the cloth different in weight per unit area.

9. The treatment liquid composition according to claim 1, wherein
   the treatment liquid composition is given to the cloth by either a contact type method or a non-contact type method in the printing method.

10. A printing method comprising:
    causing a treatment liquid composition containing water, a resin emulsion that is at least one of a urethane-based resin emulsion, a styrene acryl-based resin emulsion, an acryl-based resin emulsion, and a vinyl chloride-vinyl acetate-based resin emulsion, 1,2-alkanediol, and an aggregating agent aggregating or thickening a component of an ink composition containing a pigment to adhere to cloth; and
    causing the ink composition containing the pigment to adhere to the cloth by an ink jet method.

* * * * *